United States Patent [19]

Holl

[11] Patent Number: 5,181,247
[45] Date of Patent: Jan. 19, 1993

[54] SOUND IMAGE ENHANCING

[75] Inventor: Timothy Holl, Medway, Mass.

[73] Assignee: Bose Corporation, Framingham, Mass.

[21] Appl. No.: 557,307

[22] Filed: Jul. 23, 1990

[51] Int. Cl.$^5$ ............................................. H04R 5/02
[52] U.S. Cl. ........................................ 381/24; 381/89
[58] Field of Search .................. 381/1, 18, 24, 27, 86, 381/89; 358/189; 455/350

[56] References Cited

U.S. PATENT DOCUMENTS

| | | | |
|---|---|---|---|
| 3,171,891 | 3/1965 | Amos et al. | 381/27 |
| 3,588,355 | 6/1971 | Holm | 381/24 |
| 3,944,941 | 3/1976 | Tsuda | 381/24 |
| 4,256,922 | 3/1981 | Gönke | 381/24 |
| 4,497,064 | 1/1985 | Polk | 381/24 |
| 4,569,074 | 2/1986 | Polk | 381/1 |
| 4,586,192 | 4/1986 | Arntson | 381/24 |
| 4,612,663 | 9/1986 | Holbrock et al. | 381/1 |
| 4,882,753 | 11/1989 | Shivers | 381/24 |
| 5,005,201 | 4/1991 | Rumreich et al. | 381/24 |

Primary Examiner—Forester W. Isen
Attorney, Agent, or Firm—Fish & Richardson

[57] ABSTRACT

A speaker system includes a left channel input and a right channel input for receiving left channel and right channel signals respectively, a left channel driver, a right channel driver, an (L-R) driver unit, and a (R-L) driver unit. The left channel driver is coupled to the left channel input, and the right channel driver is coupled to the right channel input. During a video mode of operation, the (L-R) driver unit and the (R-L) driver unit are each coupled to both the left channel input and the right channel input. The (L-R) driver unit and the (R-L) driver unit have structure arranged to passively differentially combine the signals on the inputs to provide (L-R) and (R-L) acoustic output signals respectively. Switching circuitry couples the (L-R) driver unit to both the left channel input and the right channel input during the video mode of operation and to only the left channel input during an audio mode of operation, and couples the (R-L) driver unit to both the left channel input and the right channel input during the video mode of operation and to only the right channel input during the audio mode of operation.

19 Claims, 4 Drawing Sheets

LEFT CHANNEL INPUT
FROM AMPLIFIER

RIGHT CHANNEL INPUT
FROM AMPLIFIER

SWITCH POSITIONS
↖ VIDEO MODE
↗ AUDIO MODE

LEFT CHANNEL INPUT

RIGHT CHANNEL INPUT

SOUND IMAGE ENHANCING

This invention relates to enhancing perceived sound in stereophonic sound systems.

Commonly, televisions are provided with a single speaker or with a pair of left and right speakers, which are designed to project sound towards a viewer. External speakers may be spaced at some distance to either side of a television set. Speakers may also be provided which reflect, or partially reflect, sound from the walls of a room to the viewer.

"Surround sound" systems have two or more pairs of speakers, one pair of which is located behind the viewer, and the remaining speakers reproducing left and right stereo signals with or without a center monophonic channel. Similarly, the "dyna quad" system has two rear and two front speakers, with the rear speakers connected such that the positive input of one speaker is connected to the left positive output of an amplifier, and the negative input to the right positive output of the amplifier (to provide an L-R signal); the other speaker is connected between the same two outputs but in the opposite polarity, to produce an R-L signal. Both of these approaches attempt to improve the spatial presentation of video programming by adding a rear channel.

In one aspect, the invention features a speaker system that includes a left channel input and a right channel input for receiving the left channel and right channel signals respectively from an amplifier, a left channel driver coupled to the left channel input, a right channel driver coupled to the right channel input, a left minus right (L-R) driver unit coupled to both the left channel input and the right channel input, and a right minus left (R-L) driver unit coupled to both the right channel input and the left channel input. The (L-R) and (R-L) driver units have structure arranged to passively differentially combine the signals on the left channel input and the right channel input to provide (L-R) and (R-L) acoustic outputs respectively. The (L-R) driver unit and (R-L) driver unit are constructed in such a fashion that neither the (L-R) unit nor the (R-L) unit provides voice frequency spectral components when voice frequency signals at the left channel input and right channel input are the same.

In one embodiment of the invention the left minus right driver unit includes a left ambience driver coupled to the left channel input, adjacent to a right ambience driver coupled to the right channel input. The right minus left driver unit similarly includes a right ambience driver coupled to the right channel input adjacent to a left ambience driver coupled to the left channel input. The (L-R) driver unit and the (R-L) driver unit acoustically differentially combine signals on the left channel input and right channel input.

In another embodiment of the invention the left minus right driver unit has a diaphragm common to left and right voice coil portions coupled to the left and right channel inputs, respectively. The right minus left driver unit also has a diaphragm common to left and right voice coil portions coupled to the left and right channel inputs, respectively.

In exemplary embodiments the left channel driver, the (L-R) left ambience driver or voice coil portion, and the (R-L) left ambience driver or voice coil portion are connected in series to the left channel input. The right channel driver, the (R-L) right ambience driver or voice coil portion and the (L-R) right ambience driver or voice coil portion are connected in series to the right channel input. The impedances of the ambience drivers are typically higher than those of the channel drivers.

According to another aspect of the invention the speaker system includes switching circuitry that connects the (L-R) right ambience driver or voice coil portion to the right channel input during a video mode of operation, and to the left channel input during an audio mode of operation. The switching circuitry similarly connects the (R-L) left ambience driver or voice coil portion to the left channel input and right channel input, respectively, for video and audio modes, respectively. In one embodiment, the switching circuitry connects the left channel driver to the left channel input during the video mode and disconnects the left channel driver from the left channel input during the audio mode. The switching circuitry similarly connects and disconnects the right channel driver and right channel input.

In one embodiment the left channel driver and the right channel driver face forward adjacent to the video display screen on the left and right side, respectively. The (L-R) driver unit and the (R-L) driver unit face sideways from the video display screen in opposing directions, such that sound output from the (L-R) driver unit and from (R-L) driver unit can reflect from surfaces to the left and right of the video display screen respectively. In another embodiment the (L-R) driver unit and the (R-L) driver unit are at the left and right respectively of the video display screen facing a person viewing the video display screen.

In one embodiment the left channel driver and the right channel driver are full-range drivers, and the (L-R) driver unit and (R-L) driver unit are upper frequency driver units. In another embodiment the left channel driver, the right channel driver, the (L-R) driver unit, and the (R-L) driver unit are all upper frequency driver units, and the speaker system includes a bass frequency driver coupled to both the left channel input and the right channel input.

Speaker systems according to the invention provide monophonic sound that is localized at the video display screen, while providing a broader perceived sound image for stereophonic sound. The speaker system may be connected to a left channel and a right channel of a stereophonic sound system that is incorporated in a video display system to passively produce the (L-R) and (R-L) signals. The switching feature allows the same drivers to be used for both video and audio only stereophonic sound reproduction.

Other advantages and features will become apparent from the following detailed description and from the claims when read in connection with the accompanying drawings in which:

Figure 1:
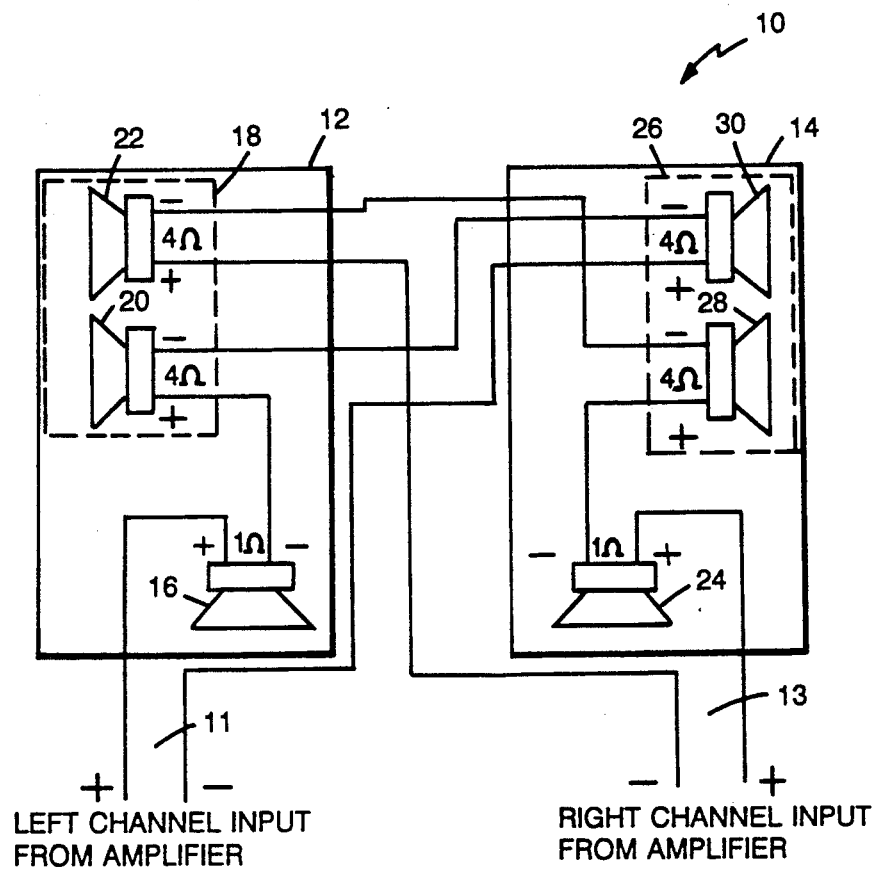
FIG. 1 is a diagram of a speaker system according to the invention in which the (L-R) and the (R-L) driver units each include two drivers.

Referring to FIG. 1, a speaker system 10 according to the invention is connected to a left channel input and a right channel input typically energized by an amplifier of a stereophonic sound system. The speaker system includes a left loudspeaker cabinet 12 and a right loudspeaker cabinet 14. The left loudspeaker cabinet 12 includes a left channel driver 16 coupled to the left channel input 11, and an (L-R) driver unit 18. The (L-R) driver unit 18 includes a left ambience driver 20 coupled to left channel input 11 and a left ambience driver 22 coupled to right channel input 13 180 degrees out of phase with the left ambience driver 20. The right loudspeaker cabinet 14 includes a right channel driver 24 coupled to right channel input 13, and a (R-L) driver unit 26. The (R-L) driver unit 26 includes a right ambience driver 28 coupled to right channel input 13 and a right ambience driver 30 coupled to left channel input 11 180 degrees out of phase with right ambience driver 28.

Left channel driver 16, left ambience driver 20, and right ambience driver 30 are connected in series, with right ambience driver 30 180 degrees out of phase with left channel driver 16 and left ambience driver 20. Right channel driver 24, right ambience driver 28, and left ambience driver 22 are also connected in series, with left ambience driver 22 180 degrees out of phase with right channel driver 24 and right ambience driver 28.

In an exemplary embodiment left channel driver 16 and right channel driver 24 are 4½-inch full-range drivers each having an impedance of one ohm, and left ambience driver 20, left ambience driver 22, right ambience driver 28, and the right ambience driver 30 are 2¼-inch upper frequency drivers each having an impedance of four ohms. The upper frequency drivers typically radiate energy having spectral components above 200 Hz.

The drivers connected in series as described above form voltage dividers. The nominal voltage across left channel driver 16 and across the right channel driver 24 is approximately 1/9 the voltage across the left and right channel inputs 11 and 13, respectively, the voltage across the left ambience driver 20 and across right ambience driver 30 is approximately 4/9 the voltage across the left channel input 11, and the voltage across right ambience driver 28 and across the left ambience driver 22 is approximately 4/9 the voltage across right channel input 13. These ratios will, of course, vary with frequency if the left and right channel drivers do not have the same impedance characteristics as the ambience drivers.

The nominal voltage across each ambience driver is four times the voltage across left channel driver 16 or right channel driver 24, but each of the full-range left channel and right channel drivers 16 and 24 typically produce approximately 6 or 7 dB more output than each of the upper frequency ambience drivers at any given voltage. This is because, even if the true efficiency is the same, the lower impedance units will experience a higher current flow for a given voltage. This higher current (4 times that of units of 4 times the impedance) alone would give a 12 dB increase in output for the same voltage applied. However, the lower impedance unit will, of necessity, have a shorter length of voice-coil wire in the magnetic field of the driver, resulting in a lower gain for the same applied voltage. Thus, assuming that all of the drivers have the same power efficiency, the output of each of the ambience drivers is approximately 12 dB − 6 or 7 dB = 5 or 6 dB louder than the output of the left channel driver 16 or the right channel driver 24. Alternatively, if the impedance of left channel driver 16 and of right channel driver 24 is two ohms and if the impedance of each of the ambience drivers is four ohms, the voltage across each of the ambience drivers will be twice the voltage across left channel driver 16 or right channel driver 24, and each of the left channel and right channel drivers 16 and 24 will produce approximately 3 dB more output than each of the ambience drivers at any given voltage. Thus the output of each of the ambience drivers will then be 6 dB minus 3 dB, or 3 dB louder than the output of left channel driver 16 or right channel driver 24. The preselected impedances of the drivers thus affect the gain of the ambience drivers relative to the left channel and the right channel drivers.

Left channel driver 16 and right channel driver 24 typically face forward, toward a listener, from left loudspeaker cabinet 12 and right loudspeaker cabinet 14, respectively. Left ambience driver 20 and left ambience driver 22 typically face sideways to the left from left loudspeaker cabinet 12, with a typical spacing of approximately two and one-half (2½) inches between the centers of the ambience drivers. Likewise, right ambience driver 28 and right ambience driver 24 face sideways to the right from right loudspeaker cabinet 14, with a typical spacing of two and one-half inches between the centers of the drivers. Sound energy output from (L-R) driver unit 18 and (R-L) driver unit 26 reflects off walls to the left of left loudspeaker cabinet 12 and to the right of right loudspeaker cabinet 14, respectively. The listener thus hears the reflected sound energy from these ambience drivers.

If the signals on left channel input 11 and right channel input 13 are the same, acoustic cancellation occurs when d is less than ½λ, where d is the distance between the two ambience drivers in the same loudspeaker cabinet, and λ is the wavelength of the sound energy output of the ambience drivers. For the typical ambience driver spacing given, the ambience drivers will acoustically cancel spectral components below approximately 2000 to 2500 Hz., which constitutes a substantial portion of the frequency range of the human voice spectral components. Subjective tests indicate that cancellation of these components is sufficient to provide excellent localization of monophonically reproduced human speech to the vicinity between left channel driver 16 and right channel driver 24 where a video display may be located.

Figure 2:
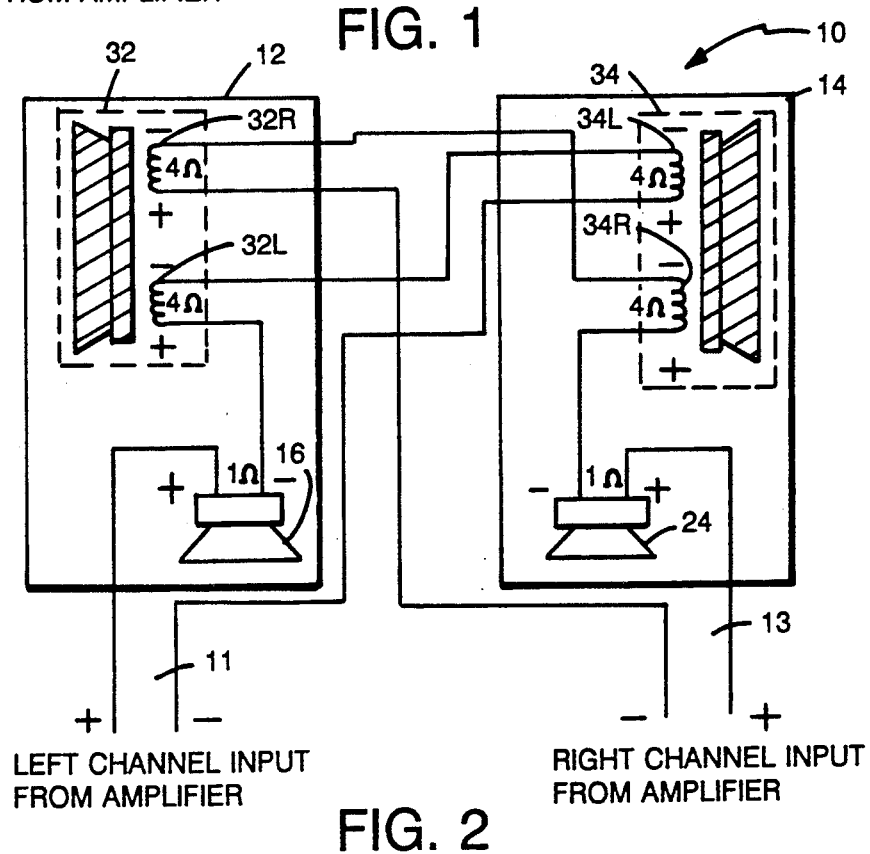
FIG. 2 is a diagram of a speaker system according to the invention having (L-R) and (R-L) driver units each having a driver with a common diaphragm and two voice coil portions.

FIG. 2 shows another embodiment of the invention, in which (L-R) driver unit 32 and (R-L) driver unit 34 each comprise a driver having left and right voice coil portions 32L, 34L, 32R, 34R, in phase opposition to passively electro-mechanically differentially combine signals on left channel input 11 and right channel input 13 over the full range of audio frequencies. Each unit has twin voice coil windings wound on a common voice coil former. If the signals of left channel input 11 and right channel input 13 are the same, each of the twin voice coil ambience drivers electro-mechanically cancels frequencies over the full audio bandwidth, as the current in the two coils produces opposing forces that cancel cone motion when the currents are equal and of opposite phase.

Figure 3:
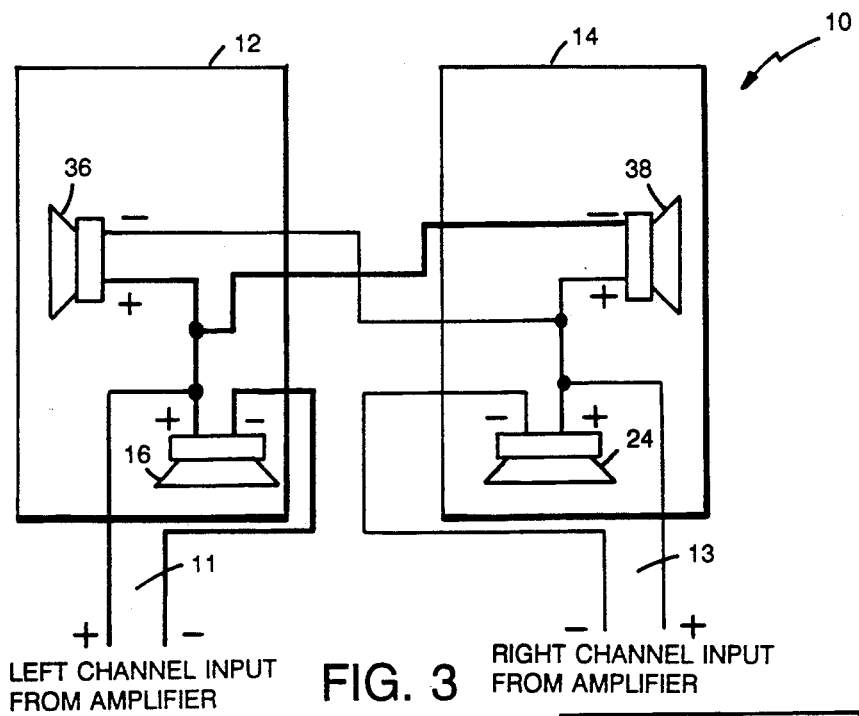
FIG. 3 is a diagram of a speaker system according to the invention having an (L-R) driver connected between terminals of the left channel input and right channel input of like polarity, and a (R-L) driver connected between terminals of the left channel input and right channel input of like polarity.

FIG. 3 shows another embodiment of the invention, having a single (L-R) driver 36 connected between the positive terminal of left channel input 11 and the positive terminal of right channel input 13, and a single (R-L) driver 38 connected between the positive terminal of right channel input 13 and the positive terminal of left channel input 11 180 degrees out of phase with (L-R) driver 36. (L-R) driver 36 and (R-L) driver 38 coact with the respective inputs to electrically passively differentially combine signals on left channel input 11 and right channel input 13.

Figure 4:
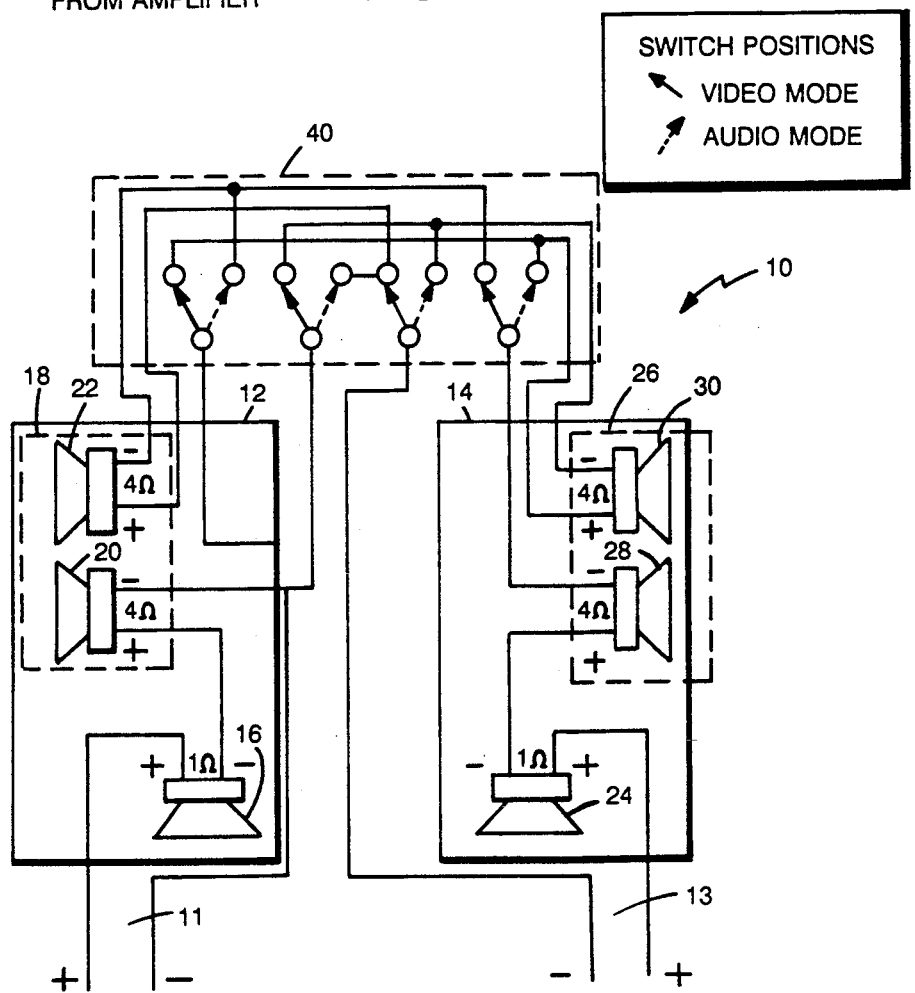
FIG. 4 is a diagram of a speaker system according to the invention that includes switching circuitry that switches between a video mode and an audio mode.

Referring to FIG. 4, there is shown an embodiment of the invention in which the speaker system includes switching circuitry 40, which switches the speaker system between a video mode of operation and an audio mode of operation. For the video mode of operation, switching circuitry 40 connects left ambience driver 22 with right channel input 13 180 degrees out of phase with left ambience driver 20, which is connected to left channel input 11, and connects right ambience driver 30 with left channel input 11 180 degrees out of phase with right ambience driver 28, which is connected to right channel input 13. For the audio mode of operation, switching circuitry 40 connects left ambience driver 22 with left channel input 11 in phase with left ambience driver 20, and connects right ambience driver 30 with right channel input 13 in phase with right ambience driver 28. Thus, during the audio mode of operation all of the drivers within left loudspeaker cabinet 12 receive the signal from left channel input 11, and all of the drivers within right loudspeaker cabinet 14 receive the signal from right channel input 13.

Figure 5:
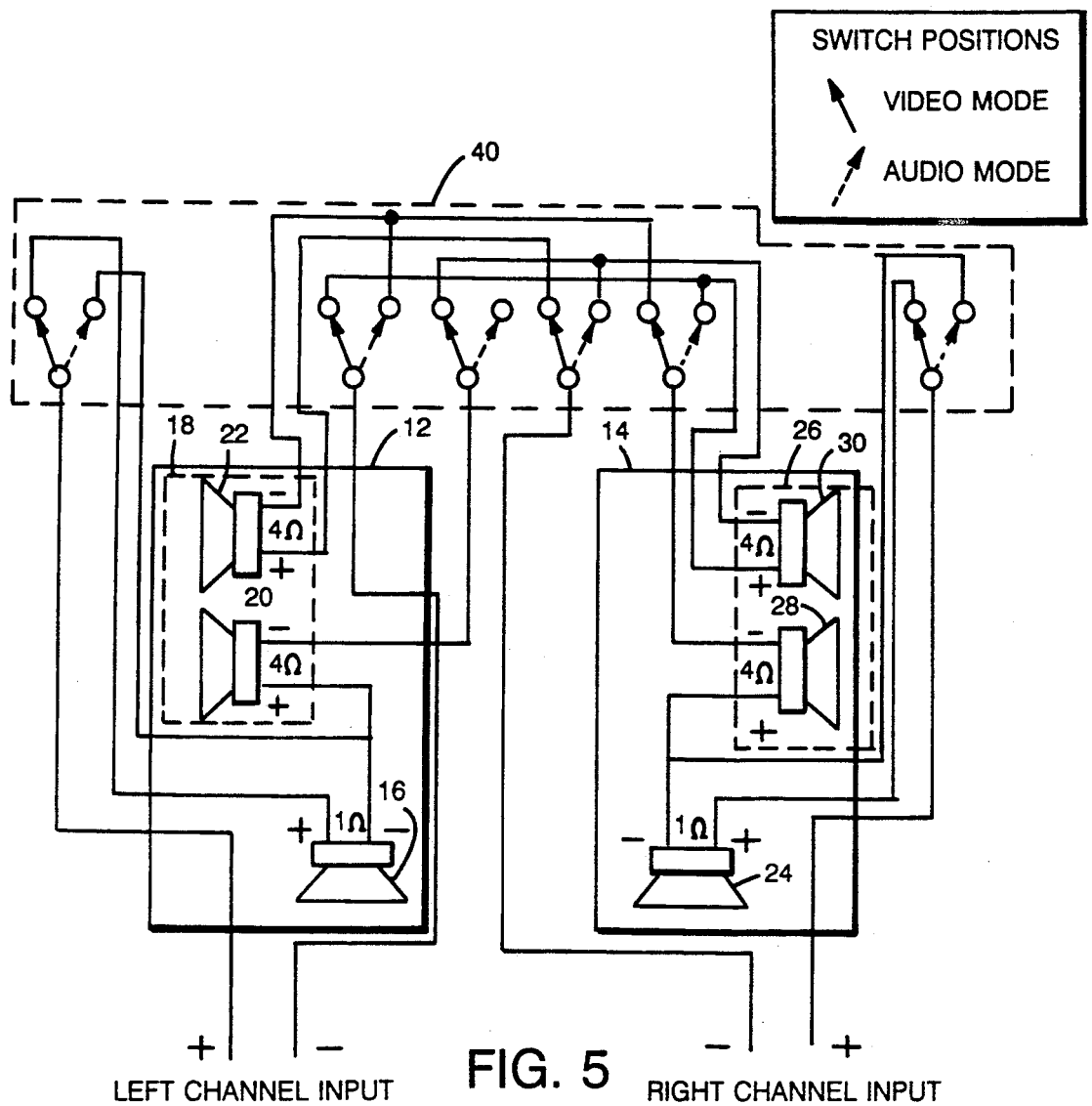
FIG. 5 is a diagram of a speaker system according to the invention that includes switching circuitry that switches between a video mode and an audio mode, and that disconnects a left channel driver and a right channel driver from the left and right channels, respectively, during the audio mode.

Referring to FIG. 5, there is shown another embodiment of the invention including switching circuitry that establishes the video mode the same as in the embodiment of FIG. 4. In the audio mode, however, the switching circuitry disconnects left channel driver 16 from the left channel and disconnects right channel driver 24 from the right channel. Thus, in the audio mode, sound emanates from the sides the left loudspeaker cabinet 12 and the right loudspeaker cabinet 14 and reflects off walls to the sides of the cabinets, but no sound output emanates from the front of the cabinets.

Figure 6:
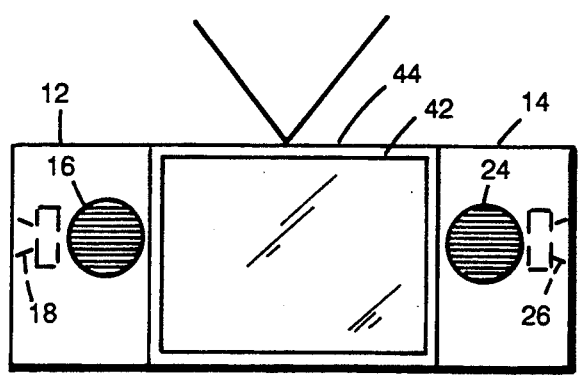
FIG. 6 is a diagram of a video display system having forward-facing left channel and right channel drivers and sideways-facing (L-R) and (R-L) driver units.

FIG. 6 shows a speaker system according to the invention in use in conjunction with a video display screen 42 of a television set 44. Left loudspeaker cabinet 12 attaches to the left side of television set 44, and the right loudspeaker cabinet 14 attaches to the right side of the television set 44. Left channel driver 16 and right channel driver 24 face forward from locations adjacent the video display screen 42 on the left and right, respectively. (L-R) driver unit 18 and (R-L) driver unit 26 face sideways to the left and right respectively from television set 44.

Figure 7:
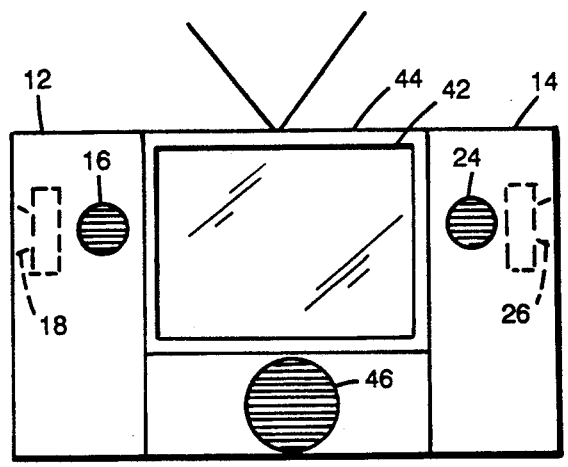
FIG. 7 is a diagram of a video display system having a left channel and a right channel driver, an (L-R) and a (R-L) driver unit, and a bass driver.

FIG. 7 shows an alternative arrangement, in which left channel driver 16 and right channel driver 14 are upper frequency drivers similar to the ambience drivers 20, 22, 28, and 30, rather than full-range drivers. All the upper frequency drivers radiate spectral components above 200 Hz. The speaker system includes a bass frequency system 46 coupled to both left channel input 11 and right channel input 13. Bass frequency system 46 may be powered or passive. Bass frequency system 46 may reside below the television set 44 and radiate the low frequency components of both the left channel signal and the right channel signal. Because it is difficult to localize on low frequency spectral components typically below 150 Hz, the precise location of bass frequency system 46 is not important.

Figure 8:
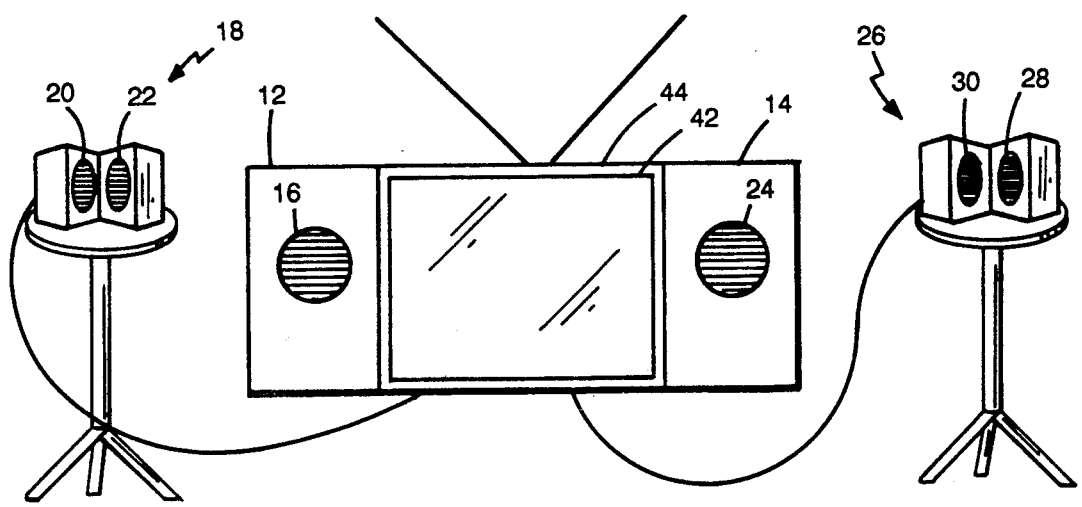
FIG. 8 is a diagram of a video display system having forward-facing left and right channel drivers and moveable (L-R) and (R-L) driver units.

FIG. 8 shows yet another arrangement, in which (L-R) driver unit 18 and (R-L) driver unit 26 face the listener from locations set apart from the television set 44 to the left and the right, respectively. Thus, left loudspeaker cabinet 12 contains left channel loudspeaker 16 only, right loudspeaker cabinet 14 contains right channel loudspeaker 24 only, and (L-R) driver unit 18 and the (R-L) driver unit 26 are separate, moveable loudspeaker units. This configuration is especially useful where it is impracticable to place (L-R) driver unit 18 and (R-L) driver unit 26 within left loudspeaker cabinet 12 and right loudspeaker cabinet 14 facing sideways. For example, a cabinet assembly may surround television set 44, or the walls to the left and the right of the television set may be too close to or too distant from the television set for good reflection of sound.

Turning now to principles of operation, the left channel and the right channel of the stereophonic sound system of television set 44 typically produce the same signal for human speech that provides monophonic sound accompanying the images on video display screen 42, and often differing signals for other sounds to provide stereophonic sound effects. A listener perceives stereophonic sound effects from left channel driver 16, right channel driver 24, the (L-R) driver unit 18, and the (R-L) driver unit 26. (L-R) driver 18 and (R-L) driver 26 present the listener with sound perceived as originating from locations spaced far to the left and right of the location of the television set 44. The listener thus perceives a sound image much broader than the width of the television set 44.

The listener hears speech from left channel driver 16 and the right channel driver 24 when the left and right channel signals are equal, but hears nothing from (L-R) driver unit 18 or (R-L) driver unit 26. Thus, the listener perceives the monophonic speech as emanating from between left channel driver 16 and right channel driver 24, which is the vicinity of the video display screen 42. The listener thus perceives monophonic speech as originating from the video display screen.

When a user switches television set 44 off, and turns on a radio, phonograph, or other audio device, the user may switch the speaker system to the audio mode. Then (L-R) driver unit 18 radiates left channel sound only, and (R-L) driver unit 26 radiates right channel sound only as in a conventional stereo system. Thus, this aspect of the invention allows selection of conventional stereo reproduction or wider perceived image with strongly localized monophonic speech components at the screen for video use at the option of the user. This aspect of the invention may also be practiced with systems having active circuits for differentially combining left and right channel signals to provide the ambience signals.

Other embodiments are within the following claims.

What is claimed is:

1. A speaker system comprising,
   a left channel input and a right channel input for receiving left channel and right channel signals respectively,
   a left channel driver coupled to said left channel input,
   a right channel driver coupled to said right channel input,
   an (L-R) driver unit coupled to both said left channel input and said right channel input having structure arranged to passively differentially combine the signals on said inputs to provide an (L-R) acoustic output signal, and
   an (R-L) driver unit coupled to both said left channel input and said right channel input having structure arranged to passively differentially combine the signals on said inputs to provide an (R-L) acoustic output signal,
   wherein said (L-R) driver unit comprises a first left ambience driver coupled to said left channel input and a second left ambience driver coupled to said right channel input 180 degrees out of phase with said left ambience driver, and
   said (R-L) driver unit comprises a first right ambience driver coupled to said right channel input and a second right ambience driver coupled to said left channel input 180 degrees out of phase with the latter right ambience driver,
   wherein said left channel driver, said first left ambience driver, and said second right ambience driver are connected tin series to said left channel input, and
   said right channel driver, said first right ambience driver, and said second left ambience driver are connected in series to said right channel input,
   wherein said drivers have impedance that aid said (L-R) driver unit to produce an output that is a predetermined amount of decibels louder than the output of said left channel driver, and said (R-L) driver unit to produce an output that is a predetermined amount of decibels louder than the output of said right channel driver.

2. The speaker system of claim 1, further comprising switching circuitry for connecting the (L-R) driver unit to said left and right channel inputs during a video mode of operation, and to said left channel input during an audio mode of operation, and for connecting the (R-L) driver unit to said right and left channel inputs during said video mode of operation and to said right channel during said audio mode of operation.

3. The speaker system of claim 2 wherein said switching circuitry is arranged for connecting said left channel driver to said left channel input during said video mode of operation, disconnecting said left channel driver from said left channel input during said audio mode of operation, connecting said right channel driver to said right channel input during said video mode of operation, and disconnecting said right channel driver from said right channel input during said audio mode of operation.

4. The speaker system of claim 1, wherein
   said (L-R) driver unit has a common diaphragm with a first left voice coil portion coupled to said left channel input and a second left voice coil portion coupled to said right channel input 180 degrees out of phase with said left voice portion, and
   said (R-L) driver unit has a common diaphragm with a first right voice portion coupled to said right channel input and a second right voice coil portion coupled to said left channel input 180 degrees out of phase with the latter right voice coil portion.

5. The speaker system of claim 4, further comprising switching circuitry for connecting the first left voice coil portion of said (L-R) driver to said left channel input, and the second left voice coil portion to said right channel input during a video mode of operation, and both said first and second (L-R) portions to said left channel input during an audio mode of operation, and for connecting the first right voice coil portion of said (R-L) driver to said right channel input, and the second right voice coil portion to said left channel input during said video mode of operation, and both said first and second (R-L) portions to said right channel input during said audio mode of operation.

6. The speaker system of claim 5 wherein said switching circuitry is for connecting said left channel driver to said left channel input during said video mode of operation, disconnecting said left channel driver from said left channel input during said audio mode of operation, connecting said right channel driver to said right channel input during said video mode of operation, and disconnecting said right channel driver from said right channel input during said audio mode of operation.

7. The speaker system of claim 1 wherein
   said left channel driver and said right channel driver are adapted to be positioned in a manner such that a listener perceives sound output from said left channel driver and from said right channel driver as originating from a location of a video display screen, and
   said (L-R) driver unit and said (R-L) driver unit are adapted to be positioned in a manner such that a listener perceives sound output from said (L-R) driver unit as originating from a first location spatially set apart from said location of said video display screen, and perceives sound output from said (R-L) driver unit as originating from a second location spatially set apart from said location of said video display screen.

8. The speaker system of claim 7 wherein said (L-R) driver unit and said (R-L) driver unit are adapted to be positioned facing sideways from said video display screen in opposing directions, in a manner such that sound output from said (L-R) driver unit and from said (R-L) driver unit can reflect off of surfaces to the left and right of said video display screen.

9. The speaker system of claim 7 wherein said (L-R) driver unit and said (R-L) driver unit are adapted to be positioned to the left and to the right of said video display screen and facing in a direction toward a person viewing said video display screen.

10. The speaker system of claim 7 wherein said left channel driver and said right channel driver are adapted to be positioned adjacent said video display screen and directed forward from said video display screen.

11. The speaker system of claim 7 wherein
    said left channel driver and said right channel driver are full-range drivers, and
    said (L-R) driver unit and said (R-L) driver unit comprise upper frequency driver units.

12. A speaker system comprising, a left channel input and a right channel input for receiving left channel and right channel signals respectively, a left channel driver coupled to said left channel input, a right channel driver coupled to said right channel input, an (L-R) driver unit coupled to both said left channel input and said right channel input having structure arranged to passively differentially combine the signals on said inputs to provide an (L-R) acoustic output signal, and an (R-L) driver unit coupled to both said left channel input and said right channel input having structure arranged to passively differentially combine the signals on said inputs to provide an (R-L) acoustic output signal, wherein said (L-R) driver unit has a common diaphragm with a first left voice coil portion coupled to said left channel input and a second left voice coil portion coupled to said right channel input 180 degrees out of phase with said left voice portion, and said (R-L) driver unit has a common diaphragm with a first right voice portion coupled to said right channel input and a second right voice coil portion coupled to said left channel input 180 degrees out of phase with the latter right voice coil portion, wherein said left channel driver and said first left and second right voice coil portions are connected in series to said left channel input, and said right channel driver and said first right and second left voice coil portions are connected in series to said right channel input.

13. The speaker system of claim 12 wherein said drivers have impedances that aid said (L-R) driver unit to produce an output that is a predetermined amount od decibels louder than the output of said left channel driver, and said (R-L) driver unit to produce an output that is a predetermined amount of decibels louder than the output of said right channel driver.

14. A speaker system comprising,
a left channel input and a right channel input for receiving left channel and right channel signals respectively, a left channel driver coupled to said left channel input, a right channel driver coupled to said right channel input, an (L-R) driver unit coupled to both said left channel input and said right channel input having structure arranged to passively differentially combine the signals on said inputs to provide an (L-R) acoustic output signal, and an (R-L) driver unit coupled to both said left channel input and said right channel input having structure arranged to passively differentially combine the signals on said inputs to provide an (R-L) acoustic output signal, wherein said left channel driver and said right channel driver are adapted to be positioned in a manner such that a listener perceives sound output from said left channel driver and from said right channel driver as originating from a location of a video display screen, and said (L-R) driver unit and said (R-L) driver unit are adapted to be positioned in a manner such that a listener perceives sound output from said (L-R) driver unit as originating from a first location spatially set apart from said location of said video display screen, and perceives sound output from said (R-L) driver unit as originating from a second location spatially set apart from said location of said video display screen, and further comprising a bass frequency system coupled to said left channel input and said right channel input, and wherein said left channel driver, said right channel driver, said (L-R) driver unit, and said (R-L) driver unit comprise upper frequency drivers.

15. A speaker system comprising
a left channel input and a right channel input for receiving left channel and right channel signals respectively, a left channel driver coupled to said left channel input, a right channel driver coupled to said right channel input, an (L-R) driver unit having structure arranged to differentially combine the signals on said inputs to provide an (L-R) acoustic output signal during a video mode of operation, a (R-L) driver unit having structure arranged to differentially combine the signals on said inputs to provide a (R-L) acoustic output signal during a video mode of operation, and switching circuitry for coupling the (L-R) driver unit to both said left channel input and said right channel input during said video mode of operation and to only said left channel input during an audio mode of operation, and for connecting the (R-L) driver unit to both said left channel input and said right channel input during said video mode of operation and to only said right channel input during said audio mode of operation.

16. The speaker system of claim 15 wherein said switching circuitry is arranged for connecting said left channel driver to said left channel input during said video mode of operation, disconnecting said left channel driver form said left channel input during said audio mode of operation, connecting said right channel driver to said right channel input during said video mode of operation, and disconnecting said right channel driver from said right channel input during said audio mode of operation.

17. The speaker system of claim 15 wherein said (L-R) driver unit and said (R-L) driver unit have structure arranged to differentially combine the signals on said left channel input and said right channel input passively.

18. The speaker system of claim 15, wherein
said (L-R) driver unit comprises a first left ambience driver coupled to said left channel input, and a second left ambience driver coupled to said right channel input 180 degrees out of phase with said left ambience driver during said video mode of operation and coupled to said left channel input in phase with said first left ambience driver during said audio mode of operation, and said (R-L) driver unit comprises a first right ambience driver coupled to said right channel input, and a second right ambience driver coupled to said left channel input 180 degrees out of phase with the latter right ambience driver during said video mode of operation and coupled to said right channel input in phase with said first right ambience driver during said audio mode of operation.

19. The speaker system of claim 15, wherein said (L-R) driver unit has a common diaphragm with a first left voice coil portion coupled to said left channel input, and a second left voice coil portion coupled to said right channel input 180 degrees out of phase with said first left voice coil portion during said video mode of operation and coupled to said left channel input in phase with said first left voice coil portion during said audio mode of operation, and said (R-L) driver unit has a common diaphragm with a first right voice coil portion coupled to said right channel input, and a second right voice coil portion coupled to said left channel input 180 degrees out of phase with said first right voice coil portion during said video mode of operation and coupled to said right channel input in phase with said first right voice coil portion during said audio mode of operation.

* * * * *

UNITED STATES PATENT AND TRADEMARK OFFICE
CERTIFICATE OF CORRECTION

PATENT NO. : 5,181,247

DATED : January 19, 1993

INVENTOR(S) : Timothy Holl

It is certified that error appears in the above-identified patent and that said Letters Patent is hereby corrected as shown below:

Column 9, line 37, "od" should --of--.

Signed and Sealed this

Twenty-second Day of March, 1994

Attest:

BRUCE LEHMAN

Attesting Officer

Commissioner of Patents and Trademarks